No. 648,146. Patented Apr. 24, 1900.
C. J. CUMMINGS.
LAND SURFACING IMPLEMENT.
(Application filed Sept. 29, 1899.)
(No Model.)
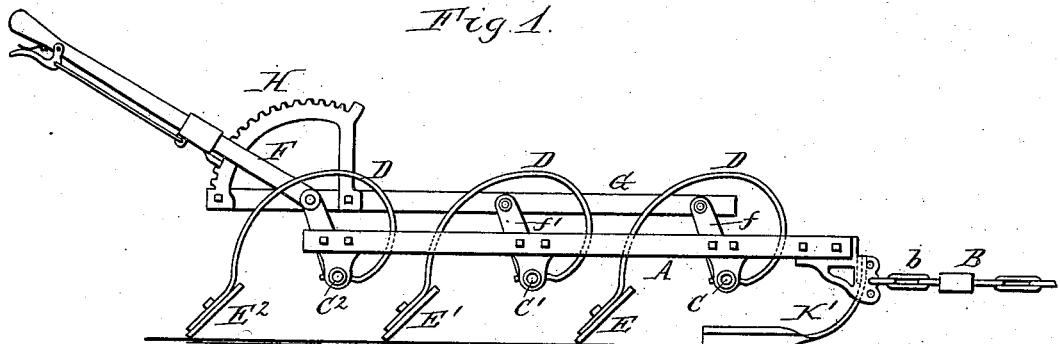
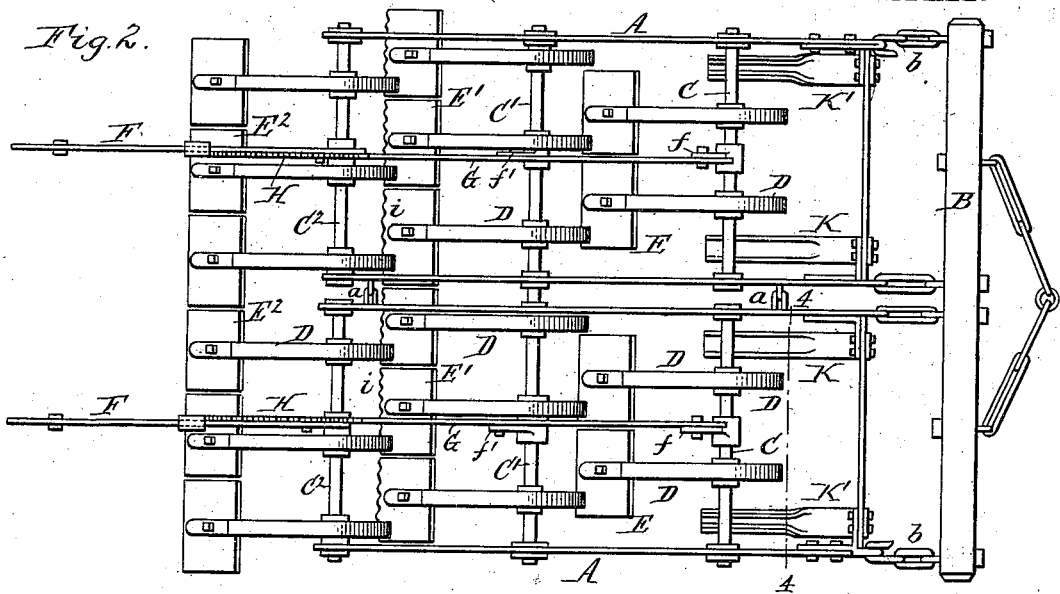
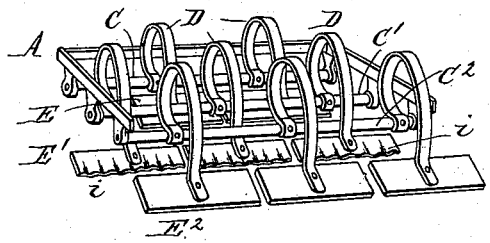
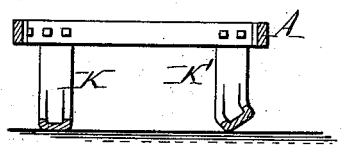
Witnesses:
Henry D. Deck.
E. A. Volk.
Chas. J. Cummings Inventor.
By Wilhelm Bonner
Attorneys.

UNITED STATES PATENT OFFICE.

CHARLES J. CUMMINGS, OF TULLY, NEW YORK.

LAND-SURFACING IMPLEMENT.

SPECIFICATION forming part of Letters Patent No. 648,146, dated April 24, 1900.

Application filed September 29, 1899. Serial No. 732,032. (No model.)

*To all whom it may concern:*

Be it known that I, CHARLES J. CUMMINGS, a citizen of the United States, residing at Tully, in the county of Onondaga and State of New York, have invented new and useful Improvements in Land-Surfacing Implements, of which the following is a specification.

This invention relates to an agricultural implement which is designed to operate upon the surface of the land after the land has been plowed and harrowed and which has the purpose to pulverize or reduce the lumps of various sizes which form a large part of the surface portion of the land to a fine state and to a practically-uniform degree of fineness.

In preparing a field for a crop the land is in many cases simply plowed and harrowed. The surface portion of such land consists largely of lumps of various sizes. This is an undesirable condition of the land for several reasons. For instance, the rain falling upon such land does not remain to any considerable extent in the surface portion, but descends directly through the large crevices existing between the lumps into the underlying portion of the land, where it can be of no benefit, as the seed remains mainly upon and in the surface portion of the land. The large crevices existing between the lumps give the air access to the lower portion of the land and assist in the rapid evaporation of the moisture and the consequent baking and hardening of the surface portion when the sun and wind act upon it after a rain. The lumpy condition of the soil also causes an unequal and improper placing of the seed, since some of the seed remains upon the lumps and some falls through the crevices to a great depth below the surface. The consequence of this is that differently-located portions of the seed are acted upon by the elements differently and sprout at different times and that some portions of the seed are deprived of the necessary conditions for germination and are lost. In many instances these difficulties are sought to be avoided by rolling the land after it has been harrowed; but this cures the difficulty only imperfectly, as the action of land-rollers is mainly to flatten, compress, and compact the surface and not to pulverize, so that many lumps are simply pressed down without being pulverized.

My invention has for its object the production of a simple and effective implement by which the lumps are effectively broken up and the soil is reduced to a uniformly-fine condition.

In the accompanying drawings, Figure 1 is a side elevation of my improved surfacing implement. Fig. 2 is a top plan view of the same. Fig. 3 is a perspective rear view of one of the sections of the implement with the adjusting devices omitted. Fig. 4 is a vertical cross-section of one of the sections or parts of the implement in line 4 4, Fig. 2, looking forward.

Like letters of reference refer to like parts in the several figures.

My improved implement resembles in the general arrangement of its parts a spring-tooth harrow and is preferably composed of two sections arranged side by side and flexibly connected, so that each section can adapt itself to the surface of the ground, as in the well-known type of butterfly-harrows. Instead of having teeth which dig into the ground my improved implement is provided with transverse surfacing-plates, which ride or float upon the ground and which pulverize the lumps. These plates are carried by spring-shanks, which are mounted like the teeth of spring-tooth harrows.

A represents the horizontal frames of the two sections, arranged side by side and connected by hinges *a*.

B represents the transverse draft-bar, which is arranged in front of the frames A and connected therewith by draft connections *b*, such as links and hooks.

Each of the frames A is provided, as shown, with three transverse bars C C' C², to which the spring-shanks D are secured, which carry at their ends the pulverizer-plates E E' E². The bars C C' C² are arranged in the frame one behind the other, in the manner in which tooth-bars are arranged in a spring-tooth harrow, and these bars are journaled in the frame, so that they can be turned for adjusting the angles of the plates. The adjusting devices can be of any ordinary construction. For instance, as shown, they can consist of upwardly-projecting arms *f f'*, secured, respectively, to the front and intermediate bars C C', an adjusting-lever F, secured to the rear bar C², a longitudinal bar G, connecting the lever F and arms *f f'*, and a notched segment H, which is secured to the longitudinal bar G and with which the adjusting-lever is interlocked.

The spring-shanks D are secured to their supporting-bars C C' C² by any suitable fastening device—for instance, by a fastening such as is ordinarily used for fastening the teeth of spring-tooth harrows to the tooth-bars.

The pulverizing-plates E E' E² are secured to the free rear ends of the spring-shanks and extend transversely or laterally therefrom. The plates are of considerable length transversely to the direction of movement and extend in the intermediate and rear rows, preferably, practically without a break across the implement. The plates stand in a rearwardly-inclined position, so that the space between the lower surface of each plate and the ground converges rearwardly. Each plate floats or rides upon the ground and pushes the lumps which it encounters along in the direction of its movement. These lumps are rolled over and over by the advancing plate and are thoroughly pulverized until the particles have become so fine that the rear or bottom edge of the plate can pass over them. The inclination of the plates is adjusted to the angle which produces this result most effectively and which differs somewhat in different soils and in different conditions of the weather.

In some cases it is desirable to crimp or corrugate the lower edge of the pulverizing-plates, or of some of them, in order to increase the pulverizing action. These crimps or corrugations are formed along the lower edge of the plate, as shown at *i* in the second row of plates. When the plates are formed of sheet-steel, which is a suitable material, such corrugations can be readily formed in the same. In going over the ground each surfacing-plate is free to adapt itself individually to the surface of the ground.

K and K' represent the runners which are secured to the front end of each frame A for carrying the extreme front portion of the same. The runners K, which are arranged at the inner front corners of each frame, have their lower running-surface arranged horizontally in a transverse direction from end to end of the runner. The runners K', which are secured to the outer corner of each frame, are twisted so that the outer face of the rear portion of these runners stands obliquely or overhangs outwardly, as most clearly shown in Fig. 4. When the implement is turned—at the end of the field, for instance—these outer runners bear sidewise against the soil with their overhanging oblique outer faces, whereby these outer runners are prevented from digging into the ground and preventing the implement from being turned over. When the implement is constructed with a single non-jointed frame, these twisted runners are applied to both outer front corners of the same frame. These runners are preferably formed of channeled bars, as shown.

The implement may be provided with a seat which may be supported on the cross-bars in the manner usual in spring-tooth harrows.

My improved implement is used for pulverizing the soil after the latter has been harrowed and reduces the surface portion of the field to a uniformly fine, loose, and not a granular condition. The soil is thereby enabled to receive and hold moisture as well as the seed uniformly and to the best advantage for the successful germination of the seed.

I claim as my invention—

1. In a land-surfacing implement, the combination with a frame, of spring-shanks supported on said frame, and inclined surfacing-plates which are secured to the free ends of said shanks and project laterally therefrom, substantially as set forth.

2. In a land-surfacing implement, the combination with a frame, of spring-shanks supported on said frame, inclined surfacing-plates secured to the free ends of said shanks and projecting laterally therefrom, and means whereby the angle of said plates can be adjusted, substantially as set forth.

3. In a land-surfacing implement, the combination with a frame, of transverse bars journaled in said frame, spring-shanks secured to said bars, transverse, inclined surfacing-plates secured to the free ends of said spring-shanks, and means whereby said bars can be turned to adjust the angle of said plates, substantially as set forth.

4. In a land-surfacing implement, the combination with a frame, of spring-shanks supported on said frame in a transverse row, and inclined surfacing-plates secured to the free ends of said shanks and extending in a row across the implement, substantially as set forth.

5. In a land-surfacing implement, the combination with a frame, of inclined, corrugated land-surfacing plates yieldingly supported on said frame, substantially as set forth.

6. In a land-surfacing implement, the combination with a frame, of inclined land-surfacing plates, yieldingly supported on said frame and having their lower edges crimped or corrugated, substantially as set forth.

7. The combination with the frame carrying instrumentalities which operate upon the soil, of runners arranged at the outer front corners of said frame and having oblique, overhanging outer faces, substantially as set forth.

Witness my hand this 6th day of September, 1899.

CHARLES J. CUMMINGS.

Witnesses:
EDWARD C. WHITBREAD,
WELLINGTON G. BREWER.